(12) United States Patent
Naeve et al.

(10) Patent No.: US 8,568,934 B2
(45) Date of Patent: Oct. 29, 2013

(54) MIXING SYSTEM FOR INERTING A GAS VOLUME

(75) Inventors: Heinz-Detlef Naeve, Muensterdorf (DE); Juergen Friedrich Haastert, Hamburg (DE); Lars Frahm, Hamburg (DE)

(73) Assignee: Airbus Operations GmbH (DE)

( * ) Notice: Subject to any disclaimer, the term of this patent is extended or adjusted under 35 U.S.C. 154(b) by 866 days.

(21) Appl. No.: 12/396,731

(22) Filed: Mar. 3, 2009

(65) Prior Publication Data

US 2009/0226778 A1    Sep. 10, 2009

Related U.S. Application Data

(60) Provisional application No. 61/068,559, filed on Mar. 7, 2008.

(30) Foreign Application Priority Data

Mar. 7, 2008    (DE) .................. 10 2008 013 150

(51) Int. Cl.

| | |
|---|---|
| *H01M 8/04* | (2006.01) |
| *H01M 8/06* | (2006.01) |
| *H01M 8/22* | (2006.01) |
| *H01M 14/00* | (2006.01) |
| *B60K 1/00* | (2006.01) |
| *G05D 11/00* | (2006.01) |
| *B01F 3/00* | (2006.01) |
| *B65D 90/22* | (2006.01) |
| *B64C 27/00* | (2006.01) |
| *B64G 1/10* | (2006.01) |
| *B63B 17/00* | (2006.01) |
| *B61D 17/00* | (2006.01) |

(52) U.S. Cl.
USPC ........... 429/415; 429/427; 429/428; 429/443; 429/505; 429/8; 137/3; 137/88; 48/180.1; 114/1; 114/343; 105/1.4; 180/65.1; 220/88.3; 244/17.11; 244/158.1

(58) Field of Classification Search
USPC ............. 429/431, 434, 432, 442, 444, 480, 8, 429/415, 427, 428, 505, 443; 48/61, 180.1; 60/280, 276, 285; 114/1, 343; 244/17.11, 158.1; 220/88.3; 137/88; 180/65.1
See application file for complete search history.

(56) References Cited

U.S. PATENT DOCUMENTS

| | | | |
|---|---|---|---|
| 2004/0083715 A1 * | 5/2004 | Le Leux et al. ................. 60/280 |
| 2004/0214059 A1 * | 10/2004 | Enjoji et al. .................... 429/22 |
| 2005/0008913 A1 * | 1/2005 | Phillips et al. .................. 429/26 |
| 2005/0112423 A1 * | 5/2005 | Omoto et al. ................... 429/20 |
| 2007/0111060 A1 | 5/2007 | Hoffjann et al. |
| 2007/0141413 A1 * | 6/2007 | Nielsen et al. .................. 429/22 |
| 2008/0070078 A1 * | 3/2008 | Gummalla et al. ............. 429/26 |

FOREIGN PATENT DOCUMENTS

| | | |
|---|---|---|
| DE | 102005054885 B4 | 5/2007 |
| WO | 2007054314 A1 | 5/2007 |
| WO | 2007054316 A1 | 5/2007 |

* cited by examiner

*Primary Examiner* — Kenneth Douyette
(74) *Attorney, Agent, or Firm* — Lerner, David, Littenberg, Krumholz & Mentlik, LLP (57) ABSTRACT

The invention relates to a mixing system for inerting a gas volume. A first exhaust gas that is provided by a fuel cell, and a second exhaust gas that is provided by a hydrogen reformer, can be mixed to form an inert gas mixture. The mixture can be fed into the gas volume for inerting.

12 Claims, 4 Drawing Sheets

MIXING SYSTEM FOR INERTING A GAS VOLUME

CROSS-REFERENCE TO RELATED APPLICATIONS

This application claims the benefit of the filing date of United States Provisional Patent Application No. 61/068,559 filed Mar. 7, 2008, the disclosure of which is hereby incorporated herein by reference.

The present invention relates to rendering inert, also referred to as "inerting", a gas volume. In particular, the invention relates to a mixing system for inerting a gas volume, to a method for inerting a gas volume, to a means of transport comprising such a mixing system for inerting, and to the use of such a mixing system in a means of transport.

BACKGROUND OF THE INVENTION

The term "inerting spaces" refers to the process of displacing, from spaces, atmospheric oxygen or potentially reactive or explosive gases or gas mixtures, by means of the addition of non-reactive (inert) gases or vapours to oxygen in air. In the process of inerting a gas volume for the purpose of protection against fire and/or explosion, atmospheric oxygen is displaced by the addition of inert gas, for example rare gas such as argon, but also nitrogen or carbon dioxide, so as to prevent the forming of a potentially explosive atmosphere. In the context of fire protection this is also referred to as active fire prevention by permanent inerting.

For approximately 40 years, halons have been used for extinguishing fires on board aircraft. Halons are partially- or entirely halogenated hydrocarbons that chemically intervene in the chain reaction of a fire, thus resulting in termination of the reactions.

However, in Germany halon fire extinguishers are no longer permitted, because halons have a detrimental effect on the ozone layer. With the halons 1211 and 1301 (bromochlorodifluoromethane and bromotrifluoromethane) having disappeared from the market as a result of the Montreal Protocol, some companies in the meantime are marketing new halons for firefighting purposes, which new halons are said to be unproblematic from the point of view of any ozone-depleting effect. At least some of these halons have already obtained EU approval. WO 2007/054316 A1 and WO 2007/054314 A1 disclose a firefighting system for extinguishing a fire in a space in an aircraft by means of a fuel cell.

PRESENTATION OF THE INVENTION

A mixing system for inerting a gas volume, a method for inerting a gas volume, a means of transport comprising a mixing system for inerting, as well as the use of a mixing system in a means of transport are provided with the features according to the independent claims. Exemplary embodiments of the invention are stated in the subordinate claims.

The described exemplary embodiments equally relate to the mixing system for inerting a gas volume, to the method for inerting a gas volume, to the means of transport comprising such a mixing system, and to the use of a mixing system in a means of transport.

According to an exemplary embodiment of the invention, a mixing system for inerting a gas volume is stated, wherein a first exhaust gas of a fuel cell can be provided to the mixing system, and wherein a second exhaust gas of a hydrogen reformer can be provided to the mixing system. In this arrangement the mixing system is equipped in such a way that the first exhaust gas and the second exhaust gas can be mixed to form an inert gas mixture, and that the inert gas mixture can be fed into the gas volume for inerting.

In this arrangement the mixing system may, for example, be implemented by a mixing chamber, a pipe intersection, or merely by the connection of two separate supply lines to a shared line.

The first exhaust gas of a fuel cell may, for example, be the waste air of the cathode of the fuel cell, around which the oxidant flows, wherein said first exhaust gas is reduced in that location (examples of oxidants are oxygen, hydrogen peroxide and potassium thiocyanate). In this arrangement it may also be possible for ambient air to flow around the cathode, wherein the oxygen in the ambient air is then oxidised at the cathode.

In this arrangement a host of different fuel-cell types may be possible, for example alkaline fuel cells, polymer electrolyte fuel cells, direct methanol fuel cells, phosphoric acid fuel cells, molten-carbonate fuel cells or solid oxide fuel cells.

The second exhaust may, for example, be the exhaust gas of any desired hydrocarbon reformer that in this arrangement is used as a hydrogen reformer. After carbon dioxide and pure hydrogen have been produced, from a hydrocarbon-water mixture, in such a hydrogen reformer, the waste air, and thus the second exhaust gas, of the mixing system predominantly comprises carbon dioxide. In contrast to this, as a rule, the cathode waste air of a fuel cell may comprise an oxygen content of 6 to 18 percent by volume. This oxygen content is controlled by the air turnover (stoichiometry) of the cathode. By mixing the cathode waste air with the waste air from a hydrogen reformer that predominantly comprises carbon dioxide, the oxygen content of the gas mixture that is to be used for inerting can be further reduced, wherein at the same time an increase in the volume flow may be achieved.

Depending on the requirements of a specific case of application, the inert gas mix, which can act as a protective-gas atmosphere, can be controlled by way of the mixing ratio of reformer waste air to cathode waste air, as well as by the cathode stoichiometry. In this arrangement the contents and the composition of the inert gas mixture can be determined as far as its composition of nitrogen, oxygen and carbon dioxide is concerned. The further products of the fuel cell, for example electric current, water and heat, can be used on site, for example in an aircraft, or they are used to support the production process or to support the enterprise in optimising and saving resources that would otherwise be used.

In contrast to this, if the mixing system is used in a stationary plant, the excess energy can be fed to the general electricity grid.

By means of combining the oxygen-reduced cathode waste air with the carbon dioxide rich waste air of a hydrogen reformer for inerting closed spaces, the exhaust gas of the hydrogen reformer, which exhaust gas up to now has been treated as a medium to be disposed of, may contribute to improved, faster, more economical and more energy-saving inerting. The oxygen concentration of a volume to be inerted may thus be further reduced, wherein at the same time the volume flow may be increased. This can have a doubly positive effect on the inerting system, i.e. the mixing system. As a result of the combination with the reformer waste air, the required fuel cell output that is provided for inerting may be reduced. Likewise, in the physical design of the fuel cell system according to the requirements for the provision of low-oxygen air, with this exemplary embodiment of the invention the size of the system to be installed, and the output that is to be generated for producing a specified volume flow with a given oxygen content, can be reduced. Thus it may also be necessary to reduce the quantity of energy that is necessary in order to render or keep the gas volume to be inerted so that it has a low oxygen content.

With this exemplary embodiment of the invention it may not only be possible to inert spaces in aircraft, for example aircraft tanks, cargo compartments or stowage compartments for foodstuffs, but the mixing system may also be used to provide protective-gas atmospheres in the metal-producing and metalworking industries or in the foodstuffs industry. For example, in the metal industry in industrial processes such as welding, sintering and the production of metal, such a mixing system can be used in order to provide inert atmospheres and, for example, in order to prevent oxidation of the process materials.

Likewise, in the foodstuffs industry the provision of inert atmospheres may be desired to increase the shelf life of foodstuffs. It may be desirable to use a particular content of nitrogen as a stabilising gas in the displacement of oxygen, whereas carbon dioxide has bacteriostatic and fungistatic effects. A certain content of oxygen that remains in the inert gas mixture can be used, for example, to maintain the red colour of meat.

In particular in mobile equipment and in means of transport a combination of already existing resources, for example the first exhaust gas of a fuel cell and the second exhaust gas of a hydrogen reformer, have a particularly positive, synergetic effect. An exhaust gas that up to now has been generated anyway, namely the exhaust gas of the hydrogen reformer, which exhaust gas predominantly comprises carbon dioxide, is now no longer led from the system, but instead can be used, in a weight-reducing and energy-reducing manner, together with the cathode waste air of the fuel cell, in order to produce hypoxic and inert atmospheres. In particular the weight advantage resulting from the combination of both exhaust gas flows for inerting is of great significance in the context of the aviation industry, which is subjected to ever more-stringent environmental conditions.

According to a further exemplary embodiment of the present invention, the first exhaust gas is the oxygen-reduced waste air of a cathode of the fuel cell.

According to a further exemplary embodiment of the present invention, the second exhaust gas is the carbon-dioxide-rich waste air of the hydrogen reformer.

A hydrogen reformer system, for example in a means of transport, may be used to produce hydrogen from hydrocarbons. This functionality of the hydrogen reformer, which functionality is independent and separate of that of the fuel cell, may be supplemented by a further advantageous functionality by the use of the reformer exhaust gas as part of the inert gas mixture.

According to a further exemplary embodiment of the present invention, the mixing system further comprises a control device, wherein the control device is equipped in such a way that a setting of a mixing ratio of the first to the second exhaust gas can be provided. In this arrangement the control device is furthermore equipped in such a way that a stoichiometric setting, comprising oxygen, hydrogen, water and carbon oxide (for example carbon monoxide, carbon dioxide) may be provided to a cathode of the fuel cell.

In this arrangement the control device is adapted to regulate and control the pressure and the volume flow of the two inflows of the first exhaust gas and the second exhaust gas into the gas volume to be inerted. By determining the mixing ratio of the first exhaust gas to the second exhaust gas it may thus be possible to implement various requirements relating to the protective-gas atmosphere, i.e. to the inert gas mixture.

Furthermore, the control device is equipped in such a way that calculations can be made that are to determine the quantity of starting materials (educts). In chemical reactions as they take place, for example, in a fuel cell or in a hydrogen reformer, a certain quantity of educts must be used in order to obtain a certain quantity of products. This may be provided by the control device. To this effect it may be possible, for example, for a calculating unit with corresponding software to be integrated in the control device. By means of these so-called stoichiometric calculations, which can be made by the control device, it may thus be possible to determine the desired setting of the hydrogen reformer or of the fuel cell, or to determine the setting of the inflow of the educts, for example the anode gas and the cathode gas (for example hydrogen as the anode gas, and atmospheric oxygen as the cathode gas).

Thus the control device may be equipped in such a way that it is possible not only to set the inflow of reaction educts to the fuel cell, but also to set the mixing ratio of the first to the second exhaust gas.

The mixing ratio of the first to the second exhaust gas can, for example, be implemented by a first valve system in a first supply line, and a further valve system in a second supply line. However, it is also possible for the operation of the fuel cell, and the exhaust gas ejection that corresponds therewith, to be regulated and controlled directly by the control device. Likewise, the control device can be equipped to regulate and control the hydrogen reformer as far as its operation and its ejection of second exhaust gas are concerned.

According to a further exemplary embodiment of the present invention, the mixing system further comprises a measuring device, wherein the measuring device is equipped in such a way that the composition of the inert gas mixture comprising nitrogen, oxygen and carbon dioxide can be determined by the measuring device. Furthermore, the measuring device is equipped in such a way that a first signal can be transmitted to the control device on the basis of the composition.

Furthermore, other substances and gases that may be contained in the composition can be detected and determined by the measuring device.

The control device may comprise a first measuring probe that can determine the ratio and the composition of the inert gas mixture comprising nitrogen, oxygen and carbon dioxide, and that can transmit these as a signal to the measuring device. Depending on the measured value of the composition, the measuring device can transmit a first signal based on this composition to the control device. In this arrangement the control device is equipped to correspondingly receive, read and further process the first signal. In this way a closed-loop control circuit can be provided, which after monitoring the composition of the inert gas mixture by means of the control device initiates the corresponding steps in order to provide an improved or desired mixing ratio of the first to the second exhaust gas. Likewise, this closed-loop control circuit can provide improved stoichiometry of a cathode of the fuel cell. This closed-loop control circuit makes it possible to implement and control a desired value or an ideal inert gas composition. It is thus possible to provide an automatic safeguarding mechanism that monitors and checks the operation of the fuel cell and of the hydrogen reformer as well as the quality of the inert gas mixture. In case of deviating values it may also be possible to send a warning signal to the user or operator of the system.

Likewise, it may be possible for the regulating device to determine separately both the composition of nitrogen, oxygen and carbon dioxide of the first exhaust gas, and the composition of nitrogen, oxygen and carbon dioxide of the second exhaust gas, and to transmit corresponding feedback signals to the control device. To this effect it may be possible, for example, to affix independent sensors in the individual supply lines.

According to a further exemplary embodiment of the present invention, the measuring device is equipped in such a way that an oxygen content of the gas volume is determinable, wherein the measuring device is equipped in such a way that a second signal, based on the oxygen content, can be transmitted to the control device.

Likewise, other substance contents in the gas volume can be detected and determined.

By means of this exemplary embodiment of the invention a control mechanism may be installed that monitors the desired value of the oxygen content in the gas volume to be inerted. It may thus be possible, for example, for a second measuring probe to be affixed in the volume to be inerted, which measuring probe communicates with the measuring device. If, for example, the operation of the fuel cell or of the hydrogen reformer were improper and the value of the emanating exhaust gases were to deviate from the desired value, this can be detected in the gas volume by means of this second measuring probe. Also, if a fire were to break out in the gas volume to be monitored, a drop in the oxygen content or the occurrence of other substances is detectable by means of the sensor. After this, signals can be transmitted to the control device, which signals in turn adjust and optimise the mixing ratio of the first to the second exhaust gas. Furthermore, direct control of the operation of the fuel cell and of the hydrogen reformer relating, for example, to the stoichiometry and the supply of educts can take place. Likewise, the valve system in the supply lines can be controlled by the control device on the basis of the second signal.

According to a further exemplary embodiment of the present invention, the gas volume is selected from the group comprising: gas volume in a fuel tank; gas volume in an aircraft tank; gas volume in a freight compartment of an aircraft; gas volume in an area where there is a potential fire hazard; gas volume around a machine in an industrial process; gas volume in a storage space for foodstuffs; and gas volume around an item to be packaged in a packaging process.

Fuel cells can be used for inerting aircraft tanks, but the use of a reformer system for the on-board production of hydrogen from hydrocarbons is also possible. By means of the combination of carbon dioxide as the exhaust gas of the reformer with the oxygen-reduced cathode waste air of the fuel cell, the oxygen concentration can be further reduced while at the same time the volume flow can be increased. Thus in the case of a gas volume in an aircraft, for the purpose of producing hypoxic and inert atmospheres of this exemplary embodiment of the invention, inerting that is easier, faster and more energy-efficient can take place. Likewise, inert atmospheres are used in industrial methods such as welding, sintering and metal production in order to prevent oxidation of the process materials. In this arrangement the mixing system can be directly coupled to a machine that uses the inert-gas mixture. Likewise, inert atmospheres are used to increase the shelf life of foodstuffs. The protective atmospheres are, among other things, supplied in bottles and are fed to the packaging process or to the packages. Depending on the objective, various enriched atmospheres are used, wherein nitrogen is used as a stabilising gas and for the displacement of oxygen; in contrast to this, carbon dioxide has bacteriostatic and fungistatic functions; while oxygen is used to preserve the red colour of meat. These functionalities may be provided by the mixing system.

By means of the above-described interaction in the control device and in the measuring device, a gas volume in a space where there is a potential fire hazard can be monitored and, if a fire breaks out, said space can be inerted in a correspondingly adjusted manner. Based on the combination of the two exhaust gas flows of the fuel cell and of the reformer, faster inerting and thus faster fire extinguishing may be ensured.

According to a further exemplary embodiment of the present invention, the mixing system further comprises the fuel cell for providing at least the first exhaust gas.

In this arrangement, for example the waste water, the electric current and the waste heat, which are present as products of the fuel cell process, may continue to be used in the surroundings of the mixing system. For example, the produced direct current may be fed to an inverted rectifier, which generates alternating current.

According to a further exemplary embodiment of the present invention, the mixing system further comprises the hydrogen reformer to provide at least the second exhaust gas.

In this arrangement, the water that arises during the reform process can, after or prior to any possible filtering, continue to be provided, for example for use by the cabin crew. It is thus possible to achieve savings in the weight of the required water that has to be carried along on board the aircraft.

According to a further exemplary embodiment of the present invention, the mixing system further comprises a condenser, wherein the condenser is equipped in such a way that the water content of the inert gas mixture may be reduced.

In order to produce the necessary degree of dryness in the inert gas mixture, which dryness is required for a particular application of the gas mixture, at least one condenser for the inert gas mixture, or in each case a separate condenser for the first exhaust gas and the second exhaust gas, is/are provided. In this arrangement the condenser can act as a heat exchanger and can reduce the humidity of the respective exhaust gas, i.e. of the first exhaust gas of the fuel cell or of the second exhaust gas of the hydrogen reformer.

According to a further exemplary embodiment of the present invention, the mixing system further comprises a filter, wherein the filter is equipped in such a way that undesirable particles can be separated from the inert gas mixture.

In this arrangement it may be necessary for the filter to separate several types of particles from the inert gas mixture, which particles are not desirable in the use of the mixture. For example, nitrogen oxides, sulphur oxides and carbon monoxides or carbon dioxides can be separated or filtered from the mixture. It is also possible to separate soot particles that originate from the hydrogen-generating system.

According to a further exemplary embodiment of the present invention, a means of transport comprising a mixing system for inerting is stated.

According to a further exemplary embodiment of the present invention, a means of transport comprising a mixing system for inerting is stated, wherein the means of transport is selected from the group comprising an aircraft, helicopter, train, automobile, means of transport in public passenger transport, ship or boat, rocket, satellite and means of transport for military use.

It may become clear that the mixing system in particular in the case of mobile locations of use, for example in an aircraft or automobile, may have a weight-reducing, energy-reducing and cost-reducing effect.

According to a further exemplary embodiment of the present invention, a method for inerting a gas volume is stated, wherein the method comprises the following steps: providing a first exhaust gas of a fuel cell; providing a second exhaust gas of a hydrogen reformer; mixing the first exhaust gas with the second exhaust gas to form an inert gas mixture; feeding the inert gas mixture into the gas volume to be inerted.

Furthermore, the step of discharging the inert gas mixture into the gas volume to be inerted may be contained in the method. In this way the combined gas mixture is advantageously used, for example, in order to reduce a fire hazard or extinguish a fire that has started.

This method for producing inert atmospheres may be used and applied, for example, for stationary fire protection, for inerting aircraft tanks, for increasing the shelf life of packaged foodstuffs or goods and products that require protection, as well as for industrial processes such as welding, sintering, and in the production of metal. By means of combining carbon dioxide as an exhaust gas of the reformer with the oxygen-reduced cathode waste air of the fuel cell, furthermore an oxygen concentration is reducible, wherein at the same time the volume flow can be increased. This double effect on the inerting system may, for example, make it possible to reduce the fuel cell output that is specified for inerting. Furthermore, by means of this method the physical dimensions of a fuel cell system can be drastically reduced. Likewise, the quantity of energy that is necessary in order to generate an inerting gas space, or to keep said gas space low in oxygen, can be reduced. Consequently the costs of inerting by means of the method and the mixing system may also be reduced.

According to a further exemplary embodiment of the present invention, the use of a mixing system for inerting in a means of transport is stated.

BRIEF DESCRIPTION OF THE DRAWINGS

Further exemplary embodiments and advantages of the invention are stated in the following description of the figures. However, the invention is not limited to these exemplary embodiments.

The illustrations in the figures are diagrammatic and not to scale.

DETAILED DESCRIPTION

Below, preferred exemplary embodiments of the present invention are described with reference to the figures.

In the following description of the figures the same reference characters are used for identical or similar elements.

Figure 1:
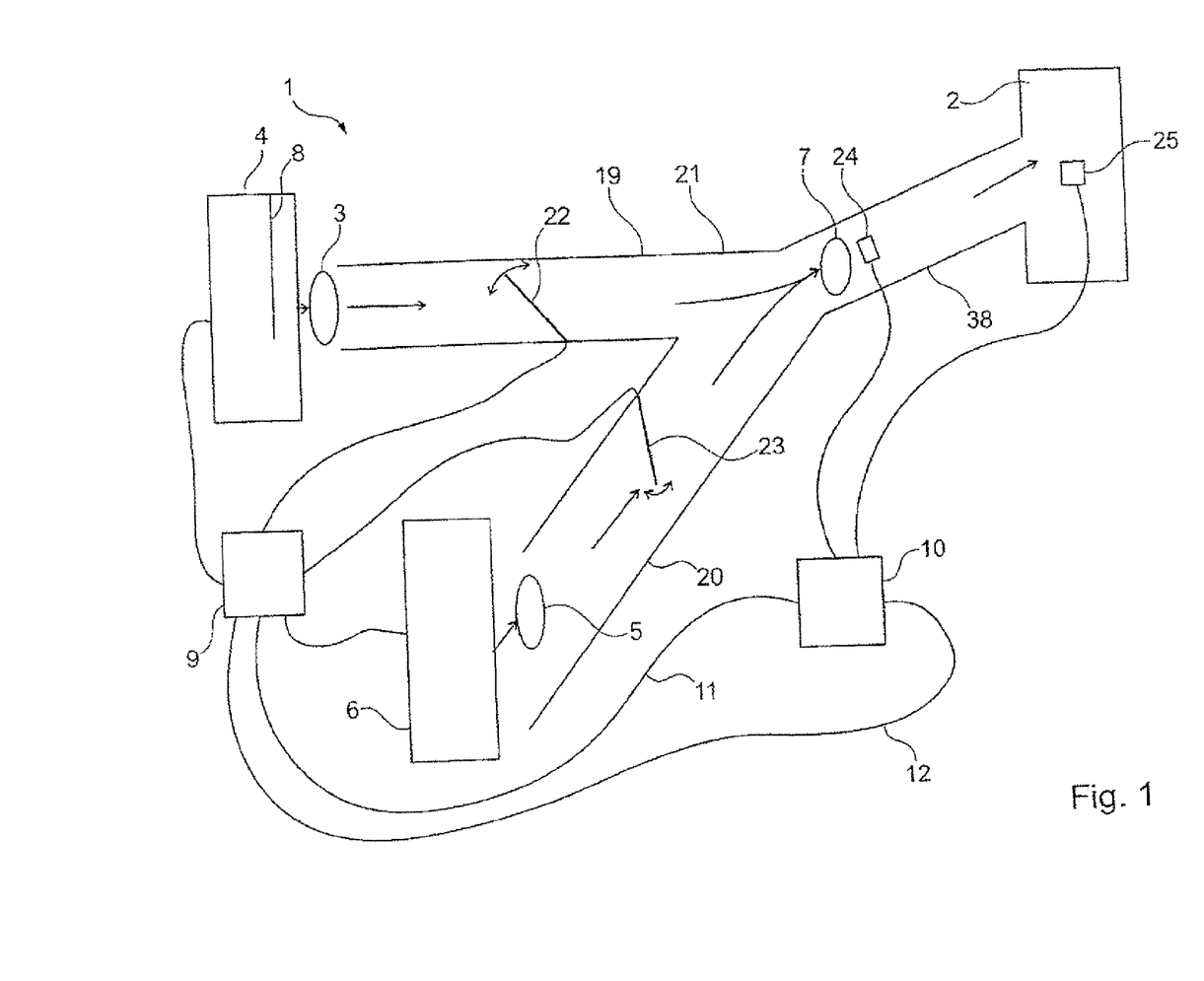
FIG. 1 shows a diagrammatic two-dimensional view of a mixing system according to an exemplary embodiment of the invention.

FIG. 1 shows a mixing system 1 for inerting a gas volume 2, wherein a first exhaust gas 3 of a fuel cell 4 is providable to the mixing system, and wherein a second exhaust gas 5 of a hydrogen reformer 6 is providable to the mixing system. In this arrangement the mixing system is equipped in such a way that the first exhaust gas and the second exhaust gas can be mixed to form an inert gas mixture 7; and wherein the mixing system is equipped in such a way that the inert gas mixture can be fed into the gas volume for inerting.

Furthermore, FIG. 1 shows a mixing system 1 according to an exemplary embodiment of the invention. The diagram shows a gas volume 2 to be inerted, which gas volume 2 is subjected to the flow of an inert gas mixture 7. In this arrangement the inert gas mixture 7 comprises a first exhaust gas 3 and a second exhaust gas 5. The first exhaust gas 3 can, for example, be cathode waste air of a fuel cell, which, depending on the stoichiometry of the cathode 8, can comprise various substance compositions. In contrast to this, the second exhaust gas 5 can originate from a hydrogen reformer 6; it is fed into a second supply line 20 in the direction of the intersection of the supply lines 21. There the first supply line 19 can be connected to the second supply line 20 in such a way that the combination of carbon dioxide as an exhaust gas of the reformer, and the oxygen-reduced cathode waste air of the fuel cell is completed.

In this arrangement a control device 9 can be equipped in such a way that it can control and regulate both a first and a second regulatable closure 22 and 23 in the first or in the second supply line as far as the throughflow of the first or the second exhaust gas is concerned. In this arrangement the first and the second closure can, for example, be designed as mechanical, electric or magnetic valves. In this arrangement the regulating device 9 is connected, either by wire or wirelessly, to the respective elements to be controlled, for example the closures 22 and 23. This is shown by the connection lines between the control device 9 and, for example, the closure 22. Furthermore, the closure device 9 is equipped in such a way that it can control and regulate the fuel cell 4 in its entire operation, for example the inflow of the anode gas and the cathode gas, as well as in relation to the control of the stoichiometry of the cathode. Moreover, regulating and adjusting the operation of the hydrogen reformer 6 is regulatable by the control device 9 as far as the production of the second exhaust gas 5 of said hydrogen reformer 6 in volume and composition is concerned.

The measuring device 10 can, for example, control two measuring probes 24 and 25, wherein the first measuring probe 24 can be affixed in the inert-gas mixture line 38. This makes it possible to precisely determine the composition of the inert gas mixture 7 and to transmit a corresponding signal from the first measuring probe 24 to the measuring unit 10. Thereafter, a first signal 11 can be transmitted by the measuring device to the control device 9 in order to initiate corresponding steps such as changing the operation of the fuel cell or of the reformer, as well as changing the state of the two closures 22 and 23.

Likewise, a second measuring probe 25 can be affixed in the gas volume to be inerted, wherein this measuring probe can measure the chemical composition and the substance composition as well as, for example, the temperature and the pressure in the gas volume; and a corresponding signal can be transmitted to the measuring device 10. Furthermore, the measuring device 10 can transmit a second signal 12 to the control device 9, after which the control device 9 can adjust and vary the control and regulation of the fuel cell of the hydrogen reformer and of the two closures.

In this arrangement the entire mixing system 1 can be designed as a mobile setup, or, alternatively, application in a means of transport is possible.

Figure 2:
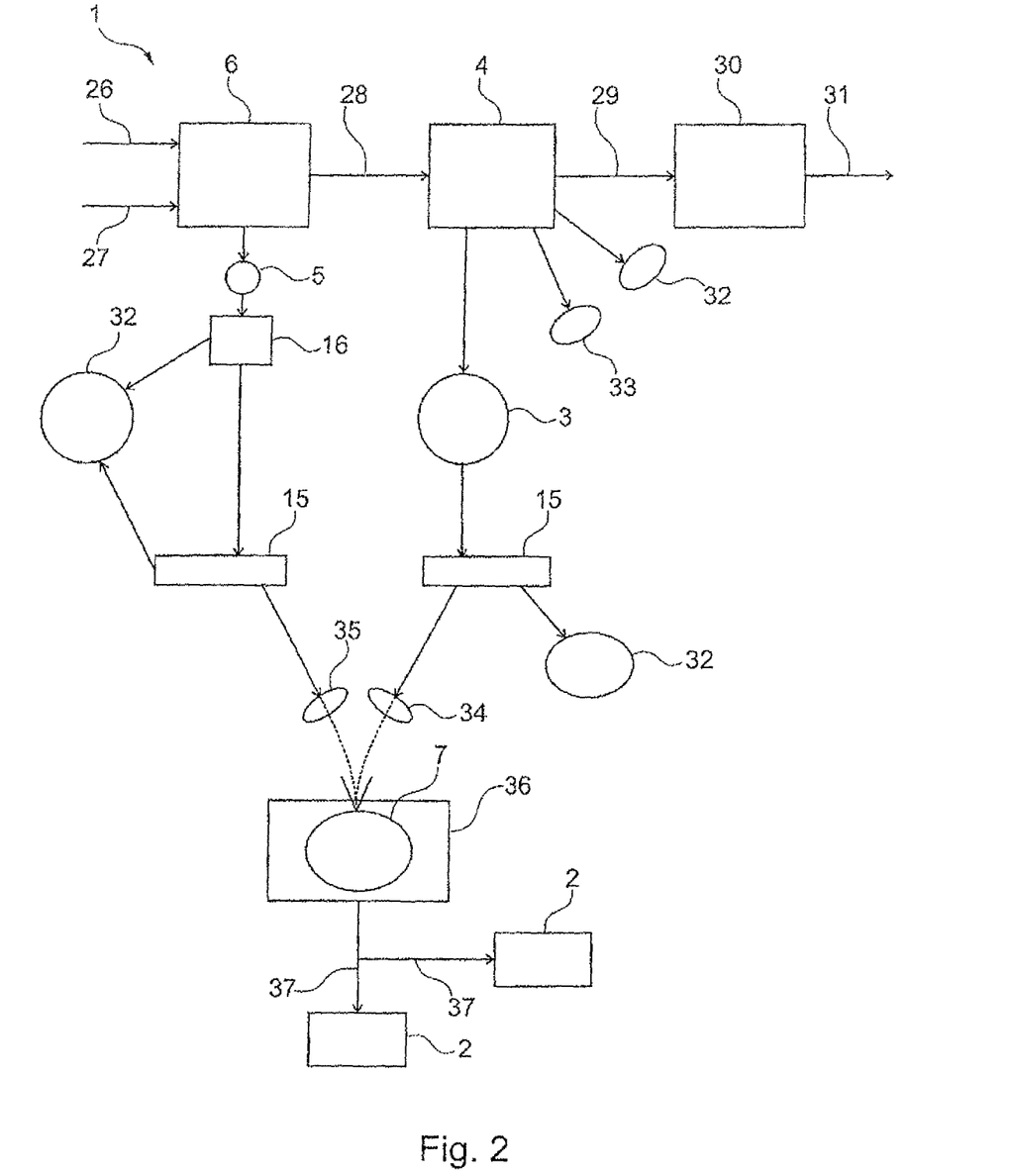
FIG. 2 shows a diagrammatic two-dimensional view of a mixing system according to a further exemplary embodiment of the invention.

FIG. 2 shows a further exemplary embodiment of the invention; it shows a mixing system 1 with a fuel cell 4 and a hydrogen reformer 6. In this arrangement the hydrogen reformer is supplied, for example, with natural gas 26 and water 27 in such a way that in a reform process the fuel cell 4 can be supplied with hydrogen 28. The second exhaust gas 5 is shown as the exhaust gas of the hydrogen reformer, wherein a filter 16 removes undesirable particles from said exhaust gas 5. Subsequently, a condenser 15 can remove the majority of the water from the second exhaust gas 2, wherein the condenser 15 acts as a heat exchanger. This water 32 can be fed to further elements of the system. However, use in other areas, for example in the aircraft as drinking water, is also possible. In parallel to this, apart from water 32 and waste heat 33, the fuel cell 4 generates direct current 29 that can be fed to an inverted rectifier 30 for the production of alternating current 31. During the process within the fuel cell, in which fuel cell the electrodes are separated from each other by a membrane or by electrolyte, the fuel (for example hydrogen, methane, methanol, or a glucose solution) flows around the anode and is oxidised in that location. The oxidant (for example oxygen, hydrogen peroxide, or potassium thiocyanate) flows around the anode, with the oxidant being reduced in said location. Thereafter, the oxygen-reduced waste air of the fuel cell, the first exhaust gas 3, may, for example, be fed to a condenser 15, in order to separate water 32 contained therein from the first exhaust gas.

In a further step the first exhaust gas downstream of the condenser 34, and the second exhaust gas downstream of the condenser 35 can be intermixed in such a way that the inert gas mixture 7 is formed. This can, for example, take place in a mixing chamber 36 that can be designed as a closed volume. However, an intersection of the pipelines, as shown for example in FIG. 1, is also possible. The subsequent distribution of the inert gas mixture into the gas volume 2 to be inerted can take place by way of the lines 37.

Figure 3:
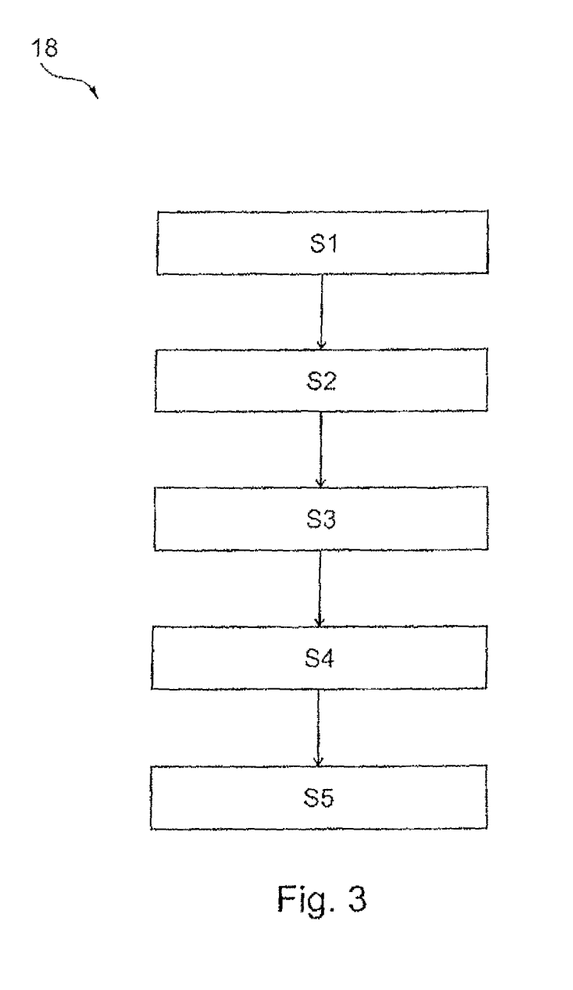
FIG. 3 shows a method for inerting a gas volume according to an exemplary embodiment of the invention.

FIG. 3 shows a method for the production of inert atmospheres 18 according to an exemplary embodiment of the invention. The diagram shows a first step S1 of providing a first exhaust gas of a fuel cell, which first step is supplemented by a second step S2 providing a second exhaust gas of a hydrogen reformer. Mixing the first exhaust gas with the second exhaust gas to form an inert gas mixture, S3; and feeding the inert gas mixture into the gas volume to be inerted, S4; together with discharging the inert gas mixture into the gas volume to be inerted, S5, constitute a first variant of the method according to the invention. This method can be used for the production of inert atmospheres for stationary fire protection, for inerting aircraft tanks for extending the shelf life of packaged foodstuffs or of goods and products that require protection, as well as for industrial processes such as welding, sintering and the production of metal.

By means of mixing the cathode waste air with the waste air from a hydrogen reformer, which predominantly comprises carbon dioxide, the oxygen content can be further reduced, while at the same time the volume flow is increased. Depending on the particular requirements, the protective gas atmosphere (nitrogen, oxygen, carbon dioxide) can be regulated by means of the mixing ratio of reformer waste air to cathode waste air, as well as by means of the cathode stoichiometry. The further products of the fuel cell (electric current, water, heat) can be used on site, for example in an aircraft, or are used to support the production process or to support the enterprise in optimising and saving resources. In stationary plant the excess energy can be fed to the electricity grid.

Figure 4:
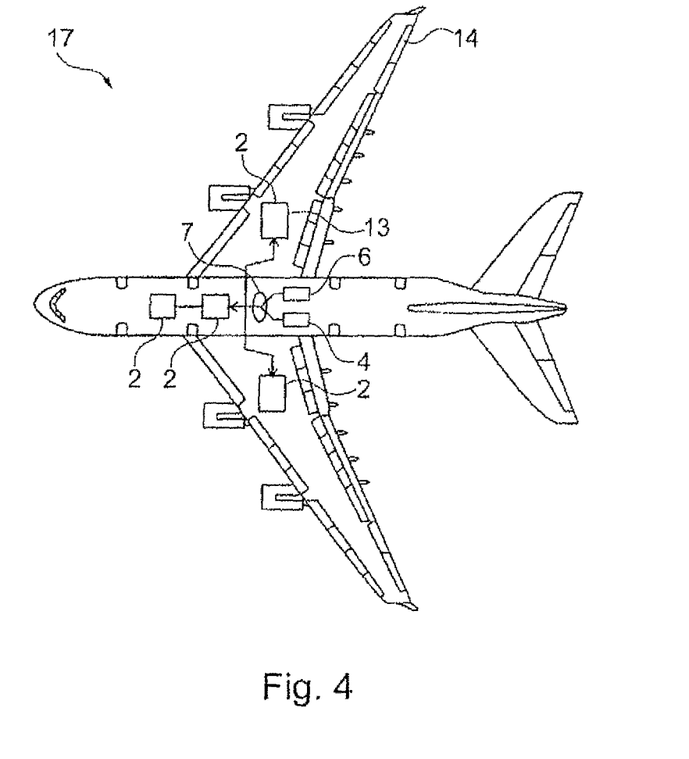
FIG. 4 shows a diagrammatic two-dimensional view of a means of transport with a mixing system according to an exemplary embodiment of the invention.

FIG. 4 shows a means of transport with a mixing system 17 according to a further exemplary embodiment of the invention. The diagram shows an aircraft 14 that comprises several gas volumes 2 to be inerted, wherein the inert gas mixture 7 is provided by a fuel cell 4 on the one hand, and by a hydrogen reformer 6 on the other hand. This mixture of the two independently-obtained exhaust gas types may not only make it possible to further reduce the oxygen concentration, but at the same time it may also achieve an increase in the volume flow. In the design of the fuel cell system according to the requirements for the provision of low-oxygen air, this invention may make it possible to reduce the size of the mixing system to be installed, and to reduce the output for generating a specified volume flow with a particular predetermined oxygen content. Consequently the quantity of energy required to keep the aircraft tanks sufficiently low in oxygen may also be reduced. An associated reduction in weight and reduction in cost in the context of aircraft may be of importance.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Mixing system
2 Gas volume to be inerted
3 First exhaust gas
4 Fuel cell
5 Second exhaust gas
6 Hydrogen reformer
7 Inert gas mixture
8 Cathode
9 Control device
10 Measuring device
11 First signal
12 Second signal
13 Fuel tank
14 Aircraft
15 Condenser/heat exchanger
16 Filter
17 Means of transport with mixing system
18 Method for inerting
19 First supply line
20 Second supply line
21 Intersection of the supply lines
22 First regulatable closure
23 Second regulatable closure
24 First measuring probe
25 Second measuring probe
26 Natural gas
27 Water
28 Hydrogen supply
29 Direct current
30 Inverted rectifier
31 Alternating current
32 Water
33 Waste heat
34 First exhaust gas downstream of condenser
35 Second exhaust gas downstream of condenser
36 Mixing chamber
37 Lines to the gas volumes to be inerted
S1 Providing a first exhaust gas of a fuel cell
S2 Providing a second exhaust gas of a hydrogen reformer
S3 Mixing the first exhaust gas with the second exhaust gas to form an inert gas mixture
S4 Feeding the inert gas mixture into the gas volume to be inerted
S5 Discharging the inert gas mixture into the gas volume to be inerted

The invention claimed is:

1. A mixing system for inerting a gas volume, the system comprising:
a line arrangement comprising:

a first supply line;
a second supply line;
a distribution line; and
a mixing region for receiving the first and second supply lines and for feeding the distribution line;
a fuel cell providing at least a first exhaust gas to the mixing region via the first supply line; and
a hydrogen reformer providing at least a second exhaust gas to the mixing region via the second supply line;
wherein the hydrogen reformer is configured to produce pure hydrogen;
wherein the mixing region is configured to mix the first exhaust gas and the second exhaust gas therein to form an inert gas mixture; and
wherein the mixing region is connected to the gas volume by the distribution line for providing the inert gas mixture into the gas volume.

2. The mixing system for inerting a gas volume of claim 1, wherein the first exhaust gas is oxygen-reduced exhaust gas of a cathode of the fuel cell.

3. The mixing system for inerting a gas volume of claim 1, wherein the second exhaust gas is carbon-dioxide-rich waste air of the hydrogen reformer.

4. The mixing system for inerting a gas volume of claim 1, with the mixing system further comprising:
a control device configured to provide a setting of a mixing ratio of the first to the second exhaust gas; and
to provide a stoichiometric setting provided to a cathode of the fuel cell.

5. The mixing system for inerting a gas volume of claim 4, further comprising:
a measuring device configured
to determine a composition of the inert gas mixture comprising nitrogen, oxygen and carbon dioxide; and
to transmit a first signal to the control device on the basis of the composition.

6. The mixing system for inerting a gas volume of claim 5, wherein the measuring device is further configured
to determine an oxygen content of the gas volume; and
to transmit a second signal, based on the oxygen content to the control device.

7. The mixing system for inerting a gas volume of claim 1, wherein the gas volume is selected from the group consisting of:
a gas volume in a fuel tank; a gas volume in an aircraft tank; a gas volume in a freight compartment of an aircraft; a gas volume in an area where there is a potential fire hazard; a gas volume around a machine in an industrial process; a gas volume in a storage space for foodstuffs; and a gas volume around an item to be packaged in a packaging process.

8. The mixing system for inerting a gas volume of claim 1, further comprising:
a condenser configured to reduce the water content of the inert gas mixture.

9. The mixing system for inerting a gas volume of claim 1, further comprising:
a filter configured to selectively separate particles from the inert gas mixture.

10. A transport device comprising:
a gas volume;
a mixing system for inerting the gas volume, the mixing system comprising:
a line arrangement comprising:
a first supply line;
a second supply line;
a distribution line; and
a mixing region for receiving the first and second supply lines and for feeding the distribution line;
a fuel cell providing at least a first exhaust gas to the mixing region via the first supply line; and
a hydrogen reformer providing at least a second exhaust gas to the mixing region via the second supply line;
wherein the hydrogen reformer is configured to produce pure hydrogen;
wherein the mixing region is configured to mix the first exhaust gas and the second exhaust gas therein to form an inert gas mixture; and
wherein the mixing region is connected to the gas volume by the distribution line for providing the inert gas mixture into the gas volume.

11. The transport device of claim 10, wherein the transport device is selected from the group consisting of an aircraft, a helicopter, a train, an automobile, a means of transport in public passenger transport, a ship, a boat, a rocket, a satellite and a transport for military use.

12. A method for inerting a gas volume, comprising:
providing a first exhaust gas of a fuel cell via a first supply line to a mixing region;
providing a second exhaust gas of a hydrogen reformer via a second supply line to the mixing region; wherein the hydrogen reformer produces pure hydrogen;
mixing the first exhaust gas with the second exhaust gas to form an inert gas mixture in the mixing region;
feeding the inert gas mixture into the gas volume from the mixing region via a distribution line.

* * * * *